United States Patent [19]

Michaelis

[11] 3,767,919

[45] Oct. 23, 1973

[54] METHOD AND DEVICE FOR THE NON-DESTRUCTIVE ANALYSIS OF NUCLEAR FUELS

[75] Inventor: Walfried Michaelis, Karlsruhe, Germany

[73] Assignee: Gesellschaft fur Kernforschung MBH, Karlsruhe, Germany

[21] Appl. No.: 85,983

[30] Foreign Application Priority Data
Oct. 31, 1969 Germany................... P 19 54 825.5

[52] U.S. Cl. ........................... 250/83.1, 250/83.3 R
[51] Int. Cl. .............................................. G01t 3/00
[58] Field of Search ...................... 250/83.1, 83.3 R, 250/83.6 R, 71.5 R

[56] References Cited
UNITED STATES PATENTS
3,222,521  12/1965  Einfeld.............................. 250/83.1

Primary Examiner—James W. Lawrence
Assistant Examiner—Davis L. Willis
Attorney—Spencer & Kaye

[57] ABSTRACT

A method and a device for the non-destructive analysis of nuclear fuels. The method provides that a neutron beam of a predetermined energy distribution is directed as the primary radiation at the nuclear fuel. The primary radiation penetrates the fuel completely and in this process, as a result of nuclear reactions, generates a secondary radiation in it. The secondary radiation emanates from all volume elements of the nuclear fuel element and reaches at least a space immediately surrounding it. The secondary radiation is there measured. The device contains a neutron source and a moderator disk providing a "1/E" neutron slowing down spectrum.

2 Claims, 3 Drawing Figures

PATENTED OCT 23 1973 3,767,919

INVENTOR.
Walfried Michaelis

BY Spencer & Kaye
ATTORNEYS.

METHOD AND DEVICE FOR THE NON-DESTRUCTIVE ANALYSIS OF NUCLEAR FUELS

The invention relates to a method and a device for the non-destructive analysis of nuclear fuels.

Such methods are to create the technical preconditions for excluding the use of nuclear fuels for non-peaceful purposes without the need for continuous inspection of all parts of a nuclear facility by inspectors. Methods of this kind, which are based on the instrumented control of the flow of fissile material at specific strategic points in the fuel cycle, are a sufficient guarantee for the impossibility to misuse nuclear fuels. At the same time, they may help to abolish reserves against control because the number of inspectors which may be necessary and the period of their presence can be greatly reduced, which largely excludes economic disadvantages to the operators of nuclear facilities as a result of the misuse of knowledge gained in the course of "manual" inspections.

The most important condition of the applicability of a method of non-destructive testing of nuclear fuels within the framework of a nuclear safeguards system (control of the flow of fissile material) is the absolute certainty with which any possible falsification of the measured result can be excluded a priori.

Passive methods based on detection of the radiation caused by nuclear decay as a consequence of the natural radioactivity of heavy elements contained in the nuclear fuel can never achieve such a high degree of tamperproofness because of the short range of this radiation and the self shielding effects occuring.

Active methods in which neutrons supplied externally (primary radiation) induce nuclear reactions in the nuclear fuel and the radiation generated in the process (secondary radiation) is measured on the surface of the nuclear fuel also have one major disadvantage, if the method of detection employed requires an upper limit of the neutron energy or if also low energy neutrons must be utilized for intensity or other reasons. The depth of penetration of primary radiation (penetrability) is limited by shielding effects so that volume elements remote from the surface are not reached. Especially the different heavy isotopes contained in nuclear fuel have different absorption cross sections which are particularly marked for specific energy ranges of the primary radiation (resonance energy); in this way, the primary radiation reaches only a thin surface layer of the nuclear fuel with a sufficient degree of intensity. A possible enrichment of fissionable isotopes in the center of a nuclear fuel rod thus could not be detected from the secondary radiation in the presence of resonance neutrons.

Therefore, the invention is based on the problem of creating a method for the simple non-destructive analysis of nuclear fuels which attains absolute tamperproofness with respect to the composition of the nuclear fuel and its contents of fissionable isotopes.

In the invention, this problem is solved by directing a neutron beam of a predetermined energy distribution on the nuclear fuel to be analyzed as a primary radiation which completely penetrates the fuel and in this process, through nuclear reactions, generates a secondary radiation in it which, emanating from all volume elements of the nuclear fuel, reaches at least a space immediately surrounding the nuclear fuel and is measured there. It is advantageous to modulate the energy distribution in the neutron beam in such a way that the intensity of the neutron flux $\Phi$ decreases with increasing energy E, i.e., a neutron slowing down spectrum is generated which roughly follows a $1/E$ curve, and afterwards those neutrons are filtered out of this spectrum whose energy corresponds to the resonance energy of the components of the nuclear fuel under analysis.

The secondary radiation induced in the nuclear fuel to be analyzed consists, for instance, of high-energy gamma radiation or prompt or delayed fast neutrons. The high energy gamma radiation is produced, e.g., in absorption events through neutron capture; after formation of a compound nucleus this changes from an excited to the ground state and releases the energy supplied to it as gamma quanta [$(n, \gamma)$-reaction].

A different possibility of generation of high-energy gamma radiation is the decay of fission products which are produced in the nuclear fuel as a result of induced nuclear fission. In the process of nuclear fission also fast neutrons are produced, prompt as well as delayed ones. This gamma and neutron radiation, which chiefly makes up the secondary radiation, is so energetic as to surely reach the space surrounding the fuel sample (measurement space) even when emanated from the volume elements remote from the surface of the nuclear fuel. This penetrability is safeguarded also for the primary radiation by bombarding the nuclear fuel only with neutrons which have no resonance energies. In this way, the cross section is sufficiently small and the neutrons of the primary beam reach the center of a nuclear fuel sample with their full intensity. If, for instance, a fuel element of inhomogeneous composition with highly enriched material in its center were investigated by the method according to the invention, also this material would be detected completely with a maximum error of the measurement in the order of 1 percent.

If, however, a neutron beam is used as the primary radiation which does not have a predetermined energy distribution according to the method of the invention, the measured result would deviate from reality by up to 570 percent in the case of an optimum enrichment of fissionable material in the center of a nuclear fuel rod for a fast breeder reactor to be analyzed.

An efficient neutron source for the generation of a primary beam for implementation of the method according to the invention is the electron linear accelerator which is used to generate a "$1/E$" neutron slowing down spectrum in the resonance range by arranging a moderator disk of several centimeter thickness containing light elements, such as hydrogen, near the target of the accelerator and slowing down a considerable part of the neutrons in this disk.

Now, those neutrons the energy of which corresponds to the resonance energy of the nuclear fuel to be analyzed are eliminated from the neutron beam by means of one or more exchangeable filter disks of $U^{235}$, $U^{238}$, $Pu^{239}$ or other isotopes contained in the nuclear fuel.

Of course, it is possible also to use some other neutron source instead of the linear accelerator, e.g., a cascade generator or a neutron flashtube, which can generate fast neutrons of a suitable energy and intensity.

One embodiment of the invention is shown in the diagram and will be described in greater detail below.

Figure 1:
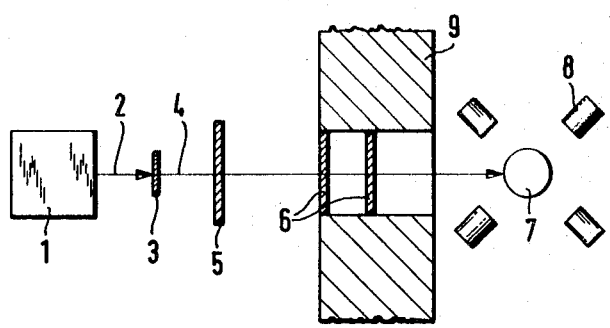
FIG. 1 is a schematic representation of a measurement system for implementing the method according to the invention.

The measurement system shown in FIG. 1 consists of a linear accelerator 1 which accelerates an electron beam 2 onto a target 3 in which neutrons are generated by nuclear reactions. The neutron beam 4 penetrates through a moderator disk 5 to produce a "1/E" neutron slowing down spectrum. Filter disks 6 of $U^{235}$, $U^{238}$, $Pu^{239}$ and/or other substances contained in the nuclear fuel rod 7 to be investigated eliminate those neutrons from the neutron beam the energy of which corresponds to the resonance energies of these materials. The secondary radiation emanating from the nuclear fuel rod 7 is measured by means of suitable detectors 8, e.g., germanium detectors or sodium iodide counters. Fuel rod 7 and detectors 8 are separated from the linear accelerator 1 by a suitable shielding 9 which has a bore for the passage of the neutron beam.

Figure 2:
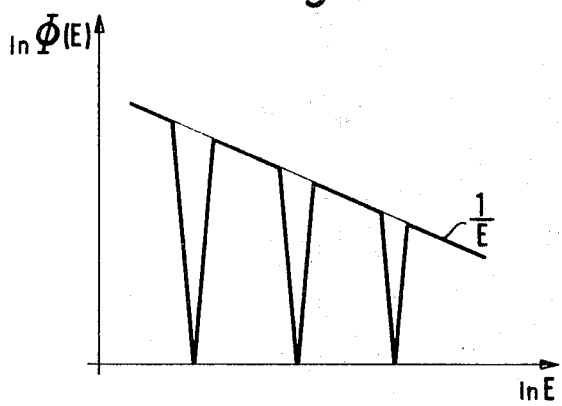
FIG. 2 is a log-log plot and shows the neutron slowing down spectrum in the resonance range.

In FIG. 2, the intensity of the neutron flux $\phi$ is indicated as a function of the neutron energy E in the resonance range. The curve of $\phi$, which roughly follows a 1/E law, is found if the neutron beam 4 leaves the moderator disk 5. The filter disks 6 eliminate the neutrons with resonance energy.

Figure 3:
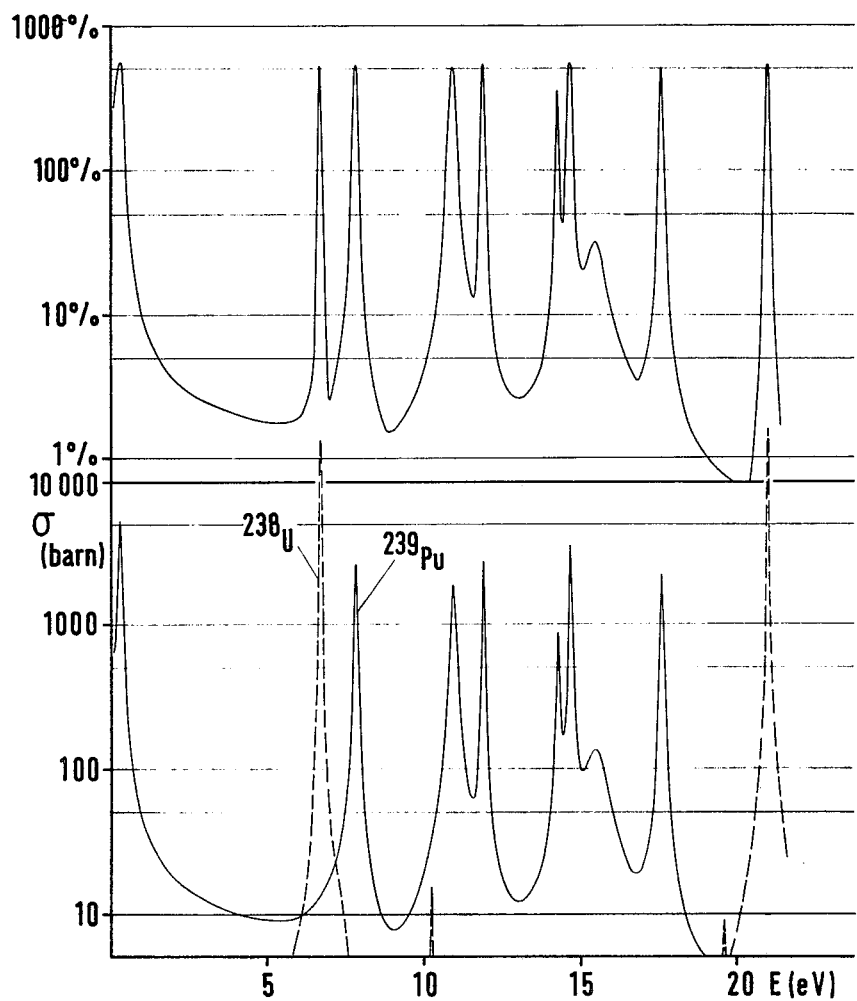
FIG. 3 shows the absorption cross section and the maximum amount of diversible material for $Pu^{239}$ and $U^{238}$ oxide.

In the lower diagram of FIG. 3, the absorption cross section for $Pu^{239}$ and $U^{238}$ is schown as a function of neutron energy.

The upper diagram of FIG. 3 shows the amount of diversible material, also as a function of the neutron energy.

The amount of diversible material is that quantity of fissionable material ($Pu^{239}$ in this case) which, given an optimum heterogeneous structure of a nuclear fuel rod, may be additionally contained in the latter without causing a difference of more than 0.5 percent in the measured result as against that of a nuclear fuel rod of a homogeneous structure (in this case, 15 percent oxide $Pu^{239}$ and 85 percent oxide $U^{238}$, density 10.35 g/cm$^3$).

The advantages of the method according to the invention are especially the reduction of the cross sections to a sufficiently low level by filtering for all neutrons incident upon the nuclear fuel, which completely precludes falsifications of the compositions of the nuclear fuel to be analyzed. This absolute tamperproofness is a decisive precondition of a considerable reduction of expenditure in terms of manpower and funds for an effective control of the flow of fissile material in which the control of nuclear facilities by measurement is limited to specific strategic points.

This fact also helps to remove existing reserves against such controls, because all possibilities of gaining technical knowledge through control which could be misused and thus might result in economic damage to the agency controlled are abolished almost completely.

Moreover, since the cross section for $U^{238}$ has a clear resonance structure, the intensities of, e.g., the gamma lines of $U^{239}$ from the $(n, \gamma)$-reaction can be improved relative to those of other isotopes by means of suitable filter thicknesses in such a way that it will be possible also to detect $U^{238}$ with certainty.

With the electron linear accelerator it is possible by means of appropriate filters to ultilize in the case of germanium detectors for the $(n, \gamma)$-reaction all neutron energies below some 5 keV. When using sodium iodide counters an energy range up to several 100 keV can be utilized.

In the case of delayed secondary radiation the primary neutron energy is subject to no restriction whatsoever.

I claim:

1. In a method of non-destructive analysis of nuclear fuels, the improvement comprising directing a neutron beam of a predetermined energy distribution, as primary radiation, at the nuclear fuel to be analyzed and completely penetrating the fuel with the beam for generating, as a result of nuclear reactions, a secondary radiation emanating from all volume elements of the nuclear fuel element and reaching at least a space immediately surrounding the nuclear fuel, and measuring the secondary energy outside of the fuel, the energy distribution in the neutron beam having a neutron slowing down spectrum which roughly follows a 1/E curve and lacking those neutrons the energy of which corresponds to the resonance energy of the components of the nuclear fuel under analysis.

2. A nuclear fuel analyzing device comprising a means for serving as a neutron source, a moderator disc means containing hydrogen for producing a "1/E" neutron slowing down spectrum in a fuel resonance range from neutrons from the source means, and a filter disc means consisting of an isotope contained in a nuclear fuel to be analyzed and installed between the neutron source means and the nuclear fuel to be analyzed for removing the isotope resonance energy component from the "1/E" spectrum.

* * * * *

UNITED STATES PATENT OFFICE
CERTIFICATE OF CORRECTION

Patent No. 3,767,919          Dated October 23rd, 1973

Inventor(s) Walfried Michaelis

It is certified that error appears in the above-identified patent and that said Letters Patent are hereby corrected as shown below:

In the heading of the patent, after line 7, insert
--[22] Filed: Nov. 2, 1970--.

Signed and sealed this 16th day of April 1974.

(SEAL)
Attest:

EDWARD M. FLETCHER, JR.                C. MARSHALL DANN
Attesting Officer                       Commissioner of Patents